(12) United States Patent  (10) Patent No.: US 7,862,404 B2
Takashima et al.  (45) Date of Patent: Jan. 4, 2011

(54) MICRO-CONCAVE PORTION MACHINING METHOD

(75) Inventors: Kazuhito Takashima, Yokohama (JP); Minoru Ota, Yokosuka (JP); Yoshitaka Uehara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 36 days.

(21) Appl. No.: 11/764,951

(22) Filed: Jun. 19, 2007

(65) Prior Publication Data

US 2007/0298691 A1   Dec. 27, 2007

(30) Foreign Application Priority Data

Jun. 23, 2006 (JP) .............................. 2006-174094
Apr. 17, 2007 (JP) .............................. 2007-107976

(51) Int. Cl.
 *B24B 1/00* (2006.01)
 *B21D 53/84* (2006.01)
(52) U.S. Cl. .............................. 451/51; 451/55; 451/58; 451/61; 451/70; 72/72; 72/123
(58) Field of Classification Search .................. 451/51, 451/55, 57, 58, 61, 65–70, 124, 180; 72/70, 72/72, 102, 112, 117, 120, 122, 123, 370.01
See application file for complete search history.

(56) References Cited

U.S. PATENT DOCUMENTS 1,422,655 A * 7/1922 Brehmer ..................... 384/283
4,004,441 A * 1/1977 Leszak ........................... 72/75
5,339,523 A * 8/1994 Hasegawa ................. 29/898.02
5,931,038 A * 8/1999 Higashi .......................... 72/70
6,253,724 B1 * 7/2001 Han ........................... 123/193.2
7,251,975 B2 * 8/2007 Shih et al. ...................... 72/112
7,267,045 B2   9/2007 Leweux et al.
7,334,337 B2 * 2/2008 Matsuura ...................... 29/898
7,389,666 B2 * 6/2008 Lugt .............................. 72/70

FOREIGN PATENT DOCUMENTS

| DE | 10 2004 002 759 A1 | 8/2005 |
| EP | 1 405 689 A1 | 4/2004 |
| EP | 1 630 396 A2 | 3/2006 |
| GB | 653708 | 5/1951 |
| JP | H07-40068 A | 2/1995 |

* cited by examiner

*Primary Examiner*—Eileen P. Morgan
(74) *Attorney, Agent, or Firm*—Global IP Counselors, LLP (57) ABSTRACT

A micro-concave portion machining method is provided for forming micro-concave portions on an inner circumferential surface of a cylindrical bore form in a workpiece. The micro-concave portion machining method includes performing mirror surface machining and subsequent plastic working on the inner circumferential surface. The plastic working on the inner circumferential surface forms a plurality of recesses with each of the recesses including a micro-concave portion.

14 Claims, 7 Drawing Sheets

FIG. 12 ng method for
forming micro-concave portions (oil reservoirs) used to
achieve a reduction in friction in an inner circumferential
surface of a cylindrical bore (round hole) such as in a cylinder
block of a vehicle engine.

2. Background Information

Several machining methods for forming micro-concave
portions in inner circumferential surfaces of cylinders in cylinder blocks have been proposed. On proposed method
includes forming grooves having a specified depth in a lattice
pattern by laser machining the inner circumferential surface
of the cylinder that has been machined beforehand. Then,
notches that are shallower than the grooves are similarly
formed by laser machining in the surfaces surrounded by
these grooves. These grooves and notches function as lubricating oil holding parts (oil reservoirs). One example of this
type of machining method for forming micro-concave portions is disclosed in Japanese Laid-Open Patent Application
No. 7-40068

In view of the above, it will be apparent to those skilled in
the art from this disclosure that there exists a need for an
improved machining method. This invention addresses this
need in the art as well as other needs, which will become
apparent to those skilled in the art from this disclosure.

SUMMARY OF THE INVENTION

It has been discovered that in the abovementioned machining method in which the micro-concave portions comprising
grooves and notches formed by laser machining, there tends
to be a variation in the depth of the micro-concave portions. In
other words, it is difficult to control the cross-sectional shape
of the micro-concave portions in the abovementioned micro-concave portion machining method. As a result, it is difficult
to achieve an effective reduction in the sliding resistance.
Furthermore, in the abovementioned micro-concave portion
machining method, the problems also arise in that the
machining apparatus is large, and the manufacturing costs are
high.

Furthermore, it is universally known that some laser
machining can be performed with high precision. In this case,
however, control is difficult, and the machining time is also
extremely long. Accordingly, high precision laser machining
is not particularly suitable for mass-produced workpieces
made of metal, such as cylinders of engine blocks.

The present invention was devised in view of the abovementioned problems. One object of the present invention to
provide a micro-concave portion machining method which is
capable of precisely and inexpensively forming micro-concave portions that can effectively reduce the sliding resistance
in an inner circumferential surface of a cylindrical bore in a
workpiece.

In order to achieve the above mentioned object, a micro-concave portion machining method is provided with mirror
surface machining an inner circumferential surface of a cylindrical bore form in a workpiece; and subsequently plastic
working the inner circumferential surface to form a plurality
of recesses with each of the recesses including a micro-concave portion.

These and other objects, features, aspects and advantages
of the present invention will become apparent to those skilled
in the art from the following detailed description, which,
taken in conjunction with the annexed drawings, discloses
preferred embodiments of the present invention.

BRIEF DESCRIPTION OF THE DRAWINGS

Referring now to the attached drawings which form a part
of this original disclosure.

DETAILED DESCRIPTION OF THE PREFERRED EMBODIMENTS

Selected embodiments of the present invention will now be
explained with reference to the drawings. It will be apparent
to those skilled in the art from this disclosure that the following descriptions of the embodiments of the present invention are provided for illustration only and not for the purpose of limiting the invention as defined by the appended claims and their equivalents.

Figure 1:
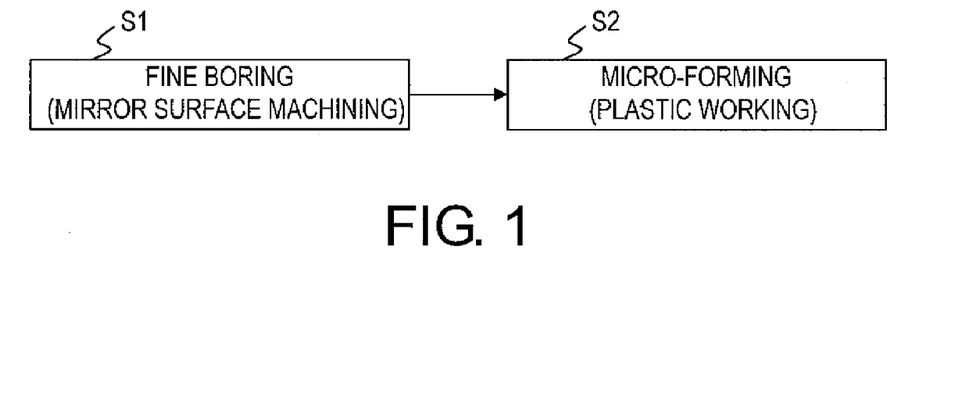
FIG. 1 is a block diagram illustrating a micro-concave
portion machining method according to one embodiment of
the present invention (Embodiment 1)

Referring initially to FIG. 1, a block diagram of a micro-concave portion machining method is illustrated in accordance with a first embodiment of the present invention. In the first embodiment, basically, micro-concave portion machining method forms a plurality of micro-concave portions on a sliding surface of a workpiece W in which the micro-concave portions function as lubricating oil holding parts (oil reservoirs). The micro-concave portion machining method includes a first operation of mirror surface machining (step S1) and a subsequent operation plastic working on the sliding surface to form a plurality of recesses with each having a micro-concave portion. The plastic working is preferably micro-forming (form-rolling in which machining is performed by rotating a tool while pressing the tool against the sliding surface).

Figure 2:
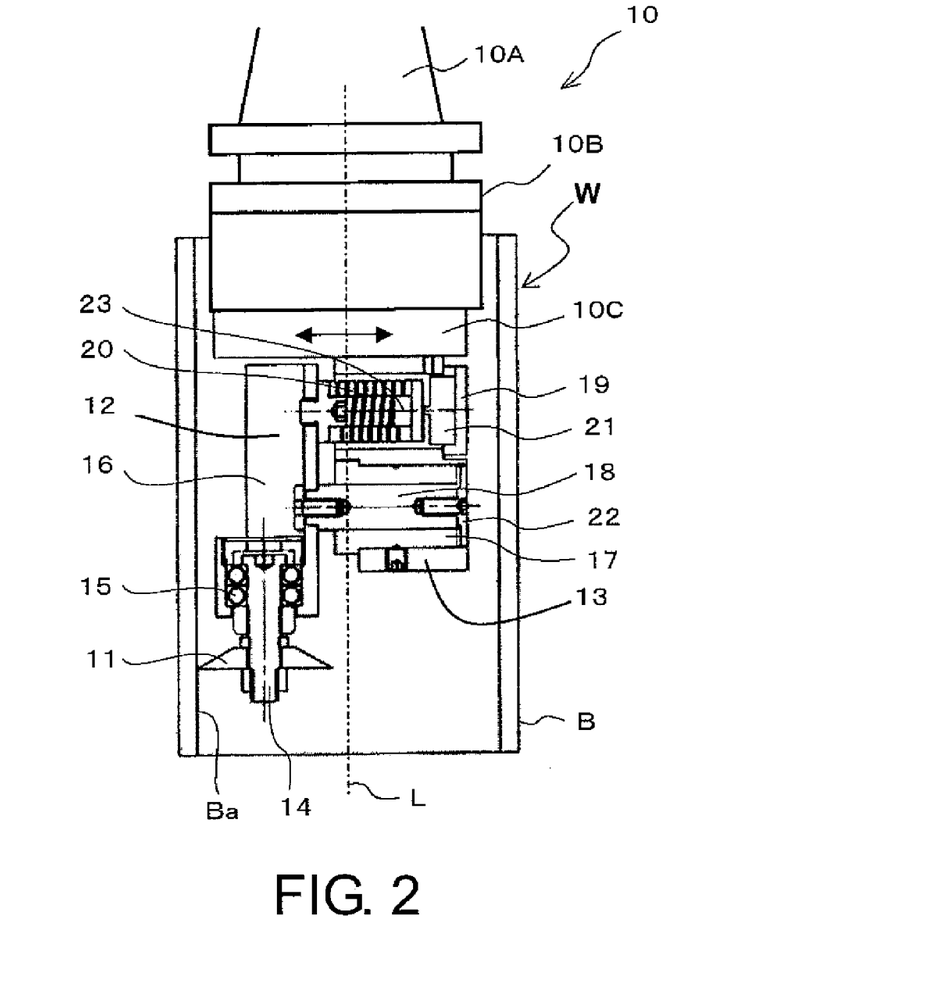
FIG. 2 is a simplified cross sectional view of a tool holder
of the micro-concave portion machining apparatus that used
in the micro-forming process shown in FIG. 1.
Figure 3:
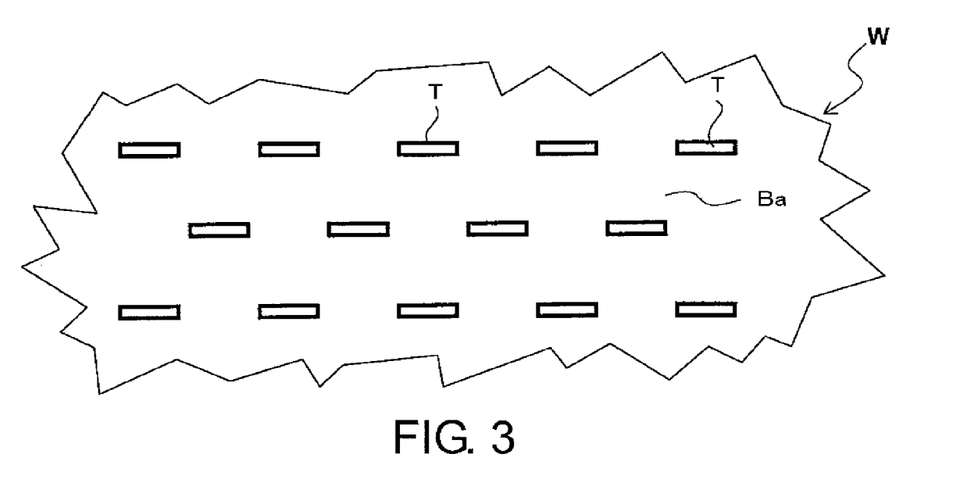
FIG. 3 is an elevational view of a portion of an inner
circumferential surface of a cylindrical bore showing a pattern of the micro-concave portions formed in the inner circumferential surface of the cylindrical bore formed with the
micro-forming process shown in FIG. 1.

As seen in FIGS. 2 and 3, the workpiece W is preferably at least one of an engine, a compressor, a sliding bearing, with a cylinder B having inner circumferential surface Ba being a sliding surface of the cylindrical bore. In the case of an engine, the inner circumferential surface B a is formed on a cylinder that constitutes the cylindrical bore of a cylinder block. In the case of a compressor, the inner circumferential surface Ba is formed on a cylinder bore that constitutes the cylindrical bore of a compression chamber. In the case of a compressor, the inner circumferential surface Ba is formed on a cylinder bore that constitutes the cylindrical bore of a compression chamber. In the case of a sliding bearing, the inner circumferential surface Ba is formed on a shaft hole that constitutes the cylindrical bore for a shaft member. Thus, this micro-concave portion machining method is particularly useful in cases in which micro-concave portions are formed in an inner circumferential surface of a workpiece with a cylindrical bore such as in an engine cylinder of a vehicle engine. As explained below, micro-concave portions are formed by plastic working once the inner circumferential surface of the cylindrical bore in the workpiece W has been subjected to mirror surface machining. Accordingly, the micro-concave portions can be formed highly precisely and inexpensively to effectively reduce the sliding resistance of the inner circumferential surface.

The micro-concave portion machining apparatus used in this embodiment is a numerically controlled (NC) machine tool that basically includes a main shaft (not shown), a workpiece table (not shown) and a holder 10 (shown in FIG. 2). The main shaft is oriented in the vertical direction which is supported in a downward-protruding state on a main shaft head that can be raised and lowered. The workpiece table is used to carry the workpiece (e.g., the cylinder B). The workpiece table can move in the two perpendicular directions within a horizontal plane beneath the main shaft head. The holder 10 is mounted coaxially on the main shaft, and rotates as a unit with the main shaft.

As shown in FIG. 2, the holder 10 has a shank part 10A, a body part 10B and an adaptor 10C. The shank part 10A is the part mounted on the main shaft. The body part 10B forms a continuation on the lower end of the shank part 10A. A work roller or tool 11 is provided on the lower end of the body part 10B. The work roller 11 has micro-indentations and micro-projections on the outer circumferential part. An arm 12 supports the work roller 11 so that the work roller 11 can rotate. A housing 13 holds the arm 12 on the lower end of the body part 10B. There are no particular restrictions on the material of the work roller 11. For example, the work roller 11 can be constructed of a super-hard metal, a hard metal other than a super-hard metal, or a ceramic such as alumina, silicon nitride or the like. The roller 11 has a diameter that is smaller than the diameter of the cylinder B.

The arm 12 that supports the work roller 11 basically includes a supporting shaft 14, multi-row angular ball bearings 15 and a supporting member 16. The supporting shaft 14 is installed parallel to the main shaft, and to which the work roller 11 is fastened. The supporting member 16 supports the supporting shaft 14 via the multi-row angular ball bearings 15 so that the shaft 14 is free to rotate. The housing 13 that holds this arm 12 is a hollow block-form housing which is connected to the body part 10B via the adaptor 10C. A spline nut 17 whose axial line is horizontally oriented is engaged and fastened to a lower-end hollow part. A spline shaft 18 is connected to the supporting member 16. The spline nut 17 and the spline shaft 18 are spline-connected to each other, so that the arm 12 can be moved in the direction perpendicular to the axis of the shaft 14.

A cap 19 is engaged with an upper-end hollow part of the housing 13. A compression coil spring 20 is interposed between the supporting member 16 of the arm 12 and the cap 19. A load oriented in the direction perpendicular to the main shaft (the direction of the diameter of the work roller 11) is applied to the supporting member 16 of the arm 12, so that the micro-indentations and micro-projections of the work roller 11 are pressed against the inner circumferential surface Ba of the cylinder B whose central axis is aligned with the rotational axis L of the holder 10. In this case, a piezoelectric load cell 21 is installed between the cap 19 and the compression coil spring 20.

Furthermore, a checking part 22 is fastened the spline shaft 18 that is spline-connected to the spline nut 17 inside the housing 13 at an opposite side of the spline shaft 18 from the supporting member 16. The checking part 22 has a diameter that is larger than the diameter of the spline shaft 18. The checking part 22 is made of a soft material such as a urethane resin. The checking part 22 restricts the expansion of the compression coil spring 20, and alleviates the shock when the compression coil spring 20 is expanded. Furthermore, the checking part 22 prevents the arm 12 from dropping out of the housing 13.

Furthermore, an adjustment bridge 23 is installed between the compression coil spring 20 and the load cell 21. The adjustment bridge 23 applies a pre-pressure to the compression coil spring 20. The pre-pressure can be adjusted by selecting the length of the adjustment bridge 23 (length in the direction of expansion and contraction of the compression coil spring 20).

The adaptor 10C is connected to the housing 13 and contains a movement mechanism comprising a stepping motor (not shown). As a result of the action of this movement mechanism, the work roller 11 held in the housing 13 can be caused to approach or move away from the inner circumferential surface Ba of the cylinder B. When micro-concave portions are to be formed in the inner circumferential surface Ba of the cylinder B using the abovementioned micro-concave portion machining apparatus, fine boring (precision boring) operation is first performed on the inner circumferential surface Ba of the cylinder B as mirror surface machining in step S1, as shown in FIG. 1. The surface roughness Ra of the inner circumferential surface Ba of the cylinder B is reduced to 0.1 μm or less.

Here, in a case where the material of the cylinder B is an aluminum alloy, a single crystal diamond cutting tool is used, and the rotational speed of the main shaft during boring is increased. As a result, the inner circumferential surface Ba with a surface roughness Ra of 0.1 μm or less can easily be obtained with a high machining efficiency. Furthermore, when the aluminum alloy is bored using a single crystal diamond, the cutting resistance is small. Accordingly, the out-of-roundness of the cylinder B and the respective precision values of the cylindricality can be improved.

Next, in step S2, a micro-forming (form-rolling in which machining is performed by rotating a tool while pressing the tool against the inner circumferential surface Ba) performed as a plastic working operation. In particular, the work roller 11 is rotated in a circumferential direction along the inner circumferential surface Ba of the cylinder B. Thus, a plastic working operation is performed on this inner circumferential surface Ba, and a plurality of the micro-concave portions T are formed in the inner circumferential surface Ba of the cylinder B as seen in FIG. 3.

Specifically, positioning is performed so that the main shaft and the central axis of the cylinder B substantially coincide. Once the holder 10 is lowered together with the main shaft, and after the work roller 11 is inserted into the cylinder B, the movement mechanism inside the adapter 10C is operated. Thus, the work roller 11 contacts the inner circumferential surface B a of the cylinder B. The operation of the movement mechanism inside the adaptor 10C is continued until the load detected by the load cell 21 (rebound force of the compression coil spring 20 applied to the work roller 11) reaches a predetermined value.

Then, in the stage where the set value of the load is detected, the operation of the movement mechanism inside the adaptor 10C is stopped, and the holder 10 rotates together with the main shaft, whereupon the work roller 11 pressed against the inner circumferential surface Ba of the cylinder B performs a following rotation. In this case, when the rotation and the lowering speed of the main shaft are synchronized, the work roller 11 rolls in a spiral form about the central axis of the cylinder B, and micro-concave portions T are continuously formed at a specified spacing in the circumferential direction in a broad area of the inner circumferential surface Ba of the cylinder B as shown in FIG. 3.

In this case, in the abovementioned micro-forming, the tip end shape of the work roller 11 is transferred by the plastic working to the micro-concave portions T that are formed. Accordingly, by making the surface roughness of the tip end part of the work roller 11 small, it is possible to reduce the surface roughness of the inner circumferential surfaces of the micro-concave portions T.

Figure 4:
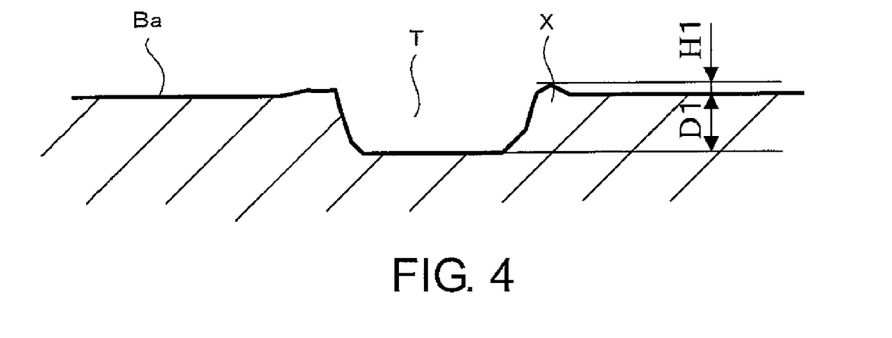
FIG. 4 is a simplified cross sectional view of the micro-concave portions shown in FIG. 3 that are formed with the
micro-forming process shown in FIG. 1.

In the peripheral areas around the micro-concave portions T formed by the abovementioned micro-forming, raised portions X along the thickness of the material are formed by the plastic working as shown in FIG. 4. The range and height of these raised portions vary according to a depth D1 of the micro-concave portions T that are formed. However, since these portions are generated as a result of the material being pushed in the lateral direction, these portions have a gentle slope and an extremely small height H1.

Figure 5:
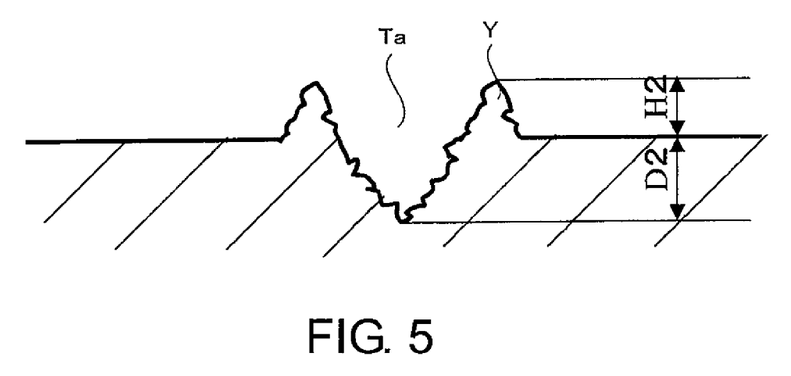
FIG. 5 is simplified cross sectional view of the micro-concave portions formed by using a YAG laser.

On the other hand, as shown in FIG. 5 for example, in cases where micro-concave portions are formed by a YAG laser, debris Y is generated in the peripheral areas around the micro-concave portions Ta. The range and the height of this debris Y vary according to a depth D2 of the micro-concave portions Ta that are formed. However, since this debris is concentrated in a narrow range at the edges of the micro-concave portions Ta, this debris has a steep slope, and the height H2 is clearly greater than that of the raised portions X generated by microforming.

Accordingly, the amount of deformation in the peripheral areas around the micro-concave portions is much smaller in a case where the micro-concave portions T are formed in the inner circumferential surface Ba of the cylinder B by microforming than in a case where micro-concave portions Ta are formed in the inner circumferential surface Ba of the cylinder B by using a YAG laser. It can also be demonstrated that the sliding resistance can be effectively reduced even in a state in which the raised portions X are left untouched.

Figure 6:
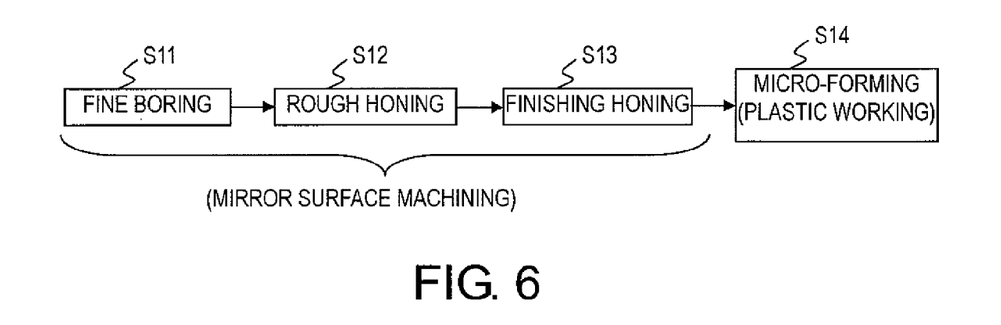
FIG. 6 is a block diagram illustrating a micro-concave
portion machining method according to another embodiment
of the present invention (Embodiment 2)

FIG. 6 shows another embodiment of the micro-concave portion machining method of the present invention. In this embodiment, a case in which micro-concave portions are formed in the inner circumferential surface Ba of a cylindrical bore such as in the engine cylinders of a cylinder block of a vehicle engine. In this case, the cylinder B is made of a high-hardness material such as cast iron, steel, or the like.

A cubic boron nitride (CBN) tool is commonly used in the cutting of cast iron. However, the shape precision of the cutting blade of a cubic boron nitride (CBN) tool is poor compared to that of a single crystal diamond tool. Furthermore, a tool which has been honed to achieve consistent sharpness of the blade in the blade tip part is used. Therefore, the cutting resistance during machining is high, and it is difficult to improve the precision relating to out-of-roundness and cylindricality. Furthermore, since the cutting temperature generated during machining is high, a high-speed machining operation cannot be performed. For these reasons, in cases where the cylinder B comprises a high-hardness material such as cast iron, steel, or the like, it is difficult to reduce the surface roughness with good efficiency in the case of boring by a fine boring operation alone.

Accordingly, in the micro-concave portion machining method of the present embodiment, the cylinder B is machined by using a fine boring (high precision boring) operation in step S11, and a honing (abrasive machining) operation is then performed on the inner circumferential surface Ba of the cylinder B as mirror surface machining as shown in FIG. 6. This honing operation can comprise a plurality of stages. Here, the honing operation includes at least two stages.

Specifically, in step S12, a rough honing operation is performed on the inner circumferential surface Ba of the cylinder B. Then, in step S13, a finishing honing operation is performed on the inner circumferential surface Ba of the cylinder B such that the surface roughness Ra of the inner circumferential surface Ba of the cylinder B is reduced to 0.1 µm or less.

Next, in step S14, a micro-forming (plastic working) operation is preformed in which the work roller 11 rolls along the internal circumferential surface Ba of the cylinder B in the same manner as in step S2 of the first embodiment. Thus, the micro-concave portions T are formed in the inner circumferential surface Ba of the cylinder B.

In this embodiment, as was described above, the inner circumferential surface Ba can be formed as a mirror surface that is effective in reducing the sliding resistance by successively performing a boring operation and an abrasive machining operation as mirror surface machining even in cases where the inner circumferential surface Ba of the cylinder B comprises a material with a high hardness such as cast iron, steel, or the like, in which mirror surface machining that reduces the surface roughness Ra to 0.1 µm or less is difficult to accomplish by boring alone, and in which the manufacturing cost is high. By subjecting this mirror surface to plastic working, it is possible to form, with a high precision and inexpensively, the micro-concave portions T that are effective in reducing the sliding resistance.

Figure 7:
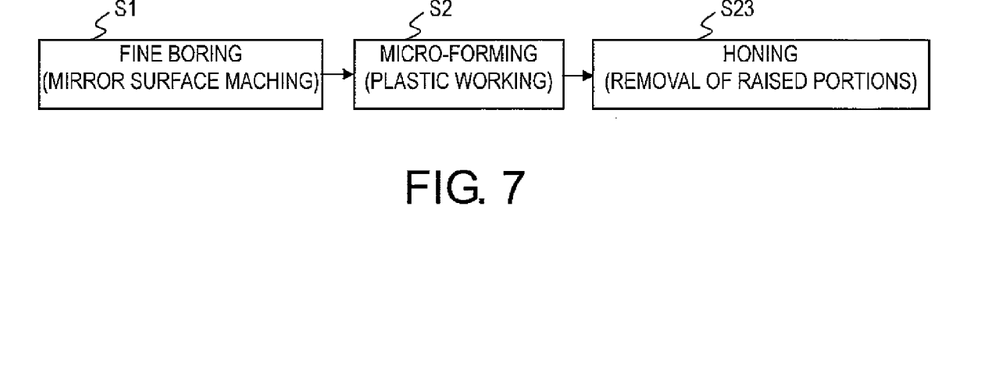
FIG. 7 is a block diagram illustrating a micro-concave
portion machining method according to still another embodiment of the present invention (Embodiment 3)

FIG. 7 shows still another embodiment of the micro-concave portion machining method of the present invention. In this second embodiment as well, a case in which micro-concave portions T are formed in the inner circumferential surface Ba of a cylindrical bore, such as in the cylinders of a cylinder block of a vehicle engine, will be described as an example.

As shown in FIG. 7, the micro-concave portion machining method in this embodiment differs from the micro-concave portion machining method in the first embodiment in that a honing (abrasive machining) operation is performed as step S23 following step S2 in the first embodiment (micro-forming which is plastic working in which the work roller 11 rolls along the inner circumferential surface Ba of the cylinder B). The honing (abrasive machining) operation of step S23 is machining operation to remove the raised portions (see FIG. 4) in the peripheral areas around the micro-concave portions generated by plastic working step S2 (micro-forming).

In step S23, variation in the honing allowance can be reduced by reducing the honing allowance, or more specifically, by setting the honing allowance to an amount that can ensure a specified depth of the micro-concave portions (e.g., 2 μm or less) by removing the raised portions. The variation in the groove depth of the micro-concave portions formed in the inner circumferential surface Ba of the cylinder B remaining after honing can be kept to an extremely small level.

Figure 8:
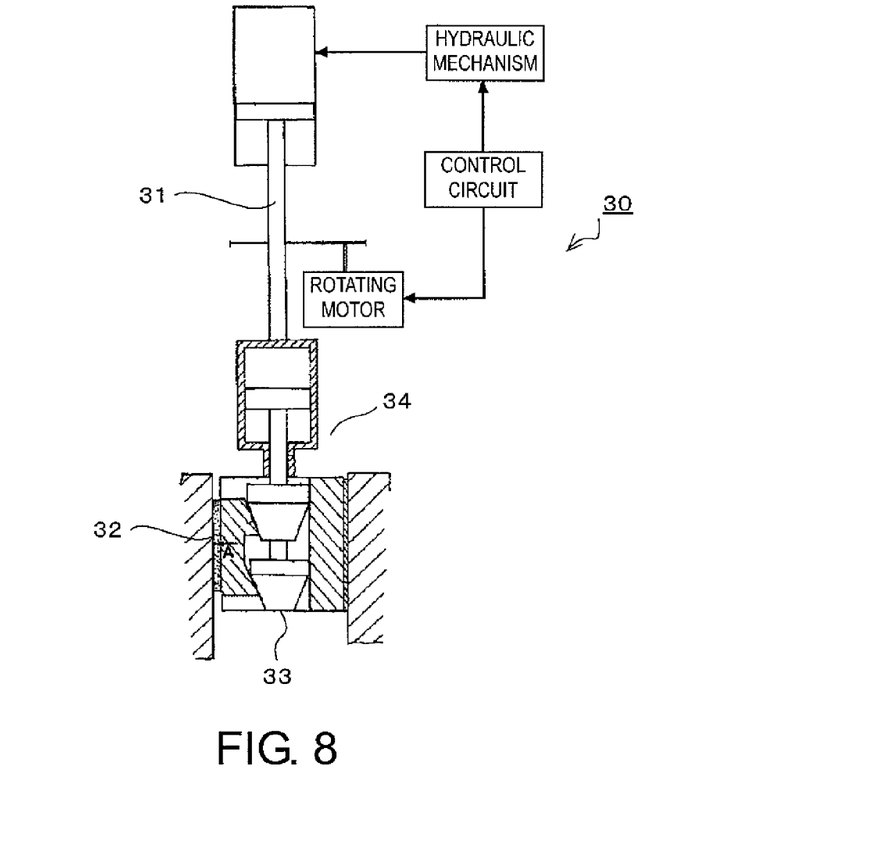
FIG. 8 is a simplified cross sectional view of the hydraulic
expansion honing apparatus used in the honing process
shown in FIG. 7.

For example, a hydraulic expansion honing apparatus 30 of the type shown in FIG. 8 can be used as the honing apparatus employed in step S23. This hydraulic expansion honing apparatus 30 basically includes a rotating shaft 31, a honing grindstone 32, a honing head 33 and a grindstone driving mechanism 34. The honing head 33 has a cylindrical shape, and is disposed so that the honing grindstone 32 can be moved in the direction of diameter on the outer circumferential surface. The honing grindstone 32 rotates together with the rotating shaft 31. The grindstone driving mechanism 34 moves the honing grindstone 32 radially in the direction of diameter. When this hydraulic expansion honing apparatus 30 is used, the pressing force of the honing grindstone 32 against the inner circumferential surface Ba of the cylinder B can easily be controlled. Furthermore, as long as machining can be performed with the honing grindstone 32 pressed against the inner circumferential surface Ba of the cylinder B with a optimal pressure, a honing apparatus that expands to a fixed dimension can also be used.

The honing grindstone 32 described above uniformly contacts the inner circumferential surface Ba of the cylinder B to obtain a surface roughness Ra of 0.1 μm or less. In this embodiment, the surface roughness is reduced, and at the same time, the honing grindstone 32 uniformly contacts with the inner circumferential surface Ba of the cylinder B.

Figure 9:
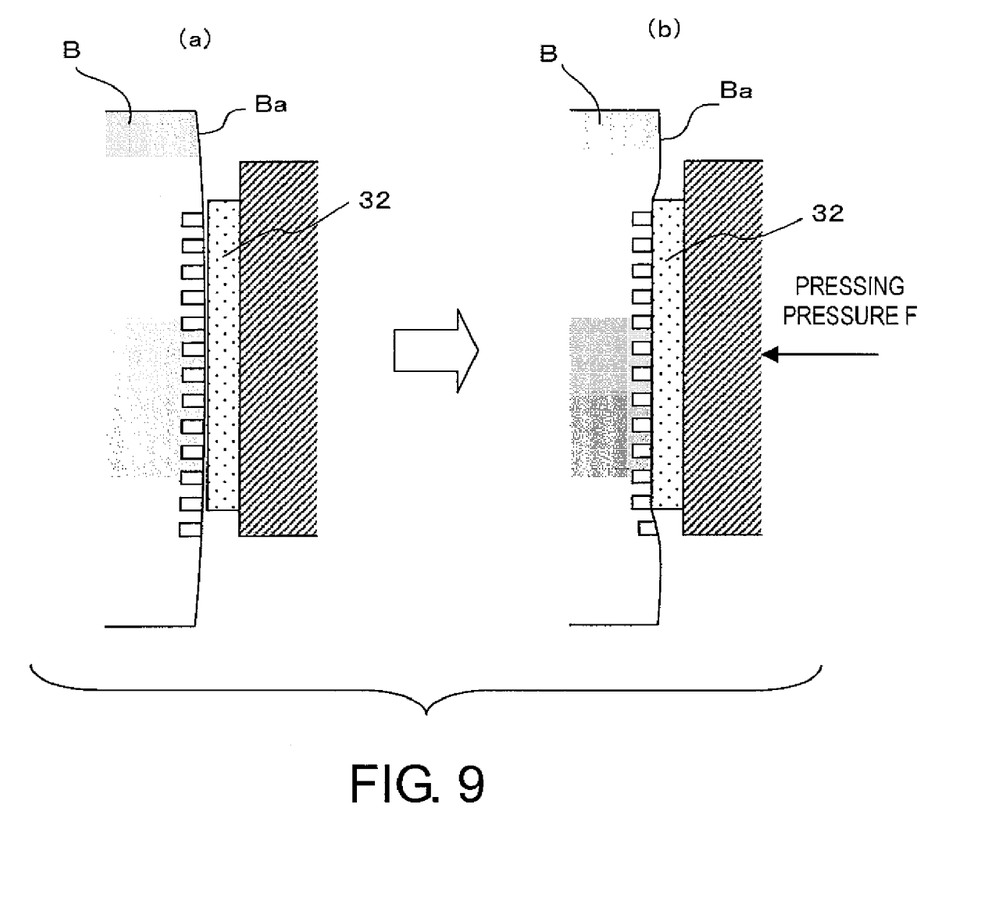
FIG. 9 is a pair of simplified cross sectional views illustrating the state in which the inner circumferential surface of
the cylindrical bore undergoes elastic deformation such that
the honing grindstone uniformly contacts this inner circumferential surface, in the honing process shown in FIG. 7.
Figure 10:
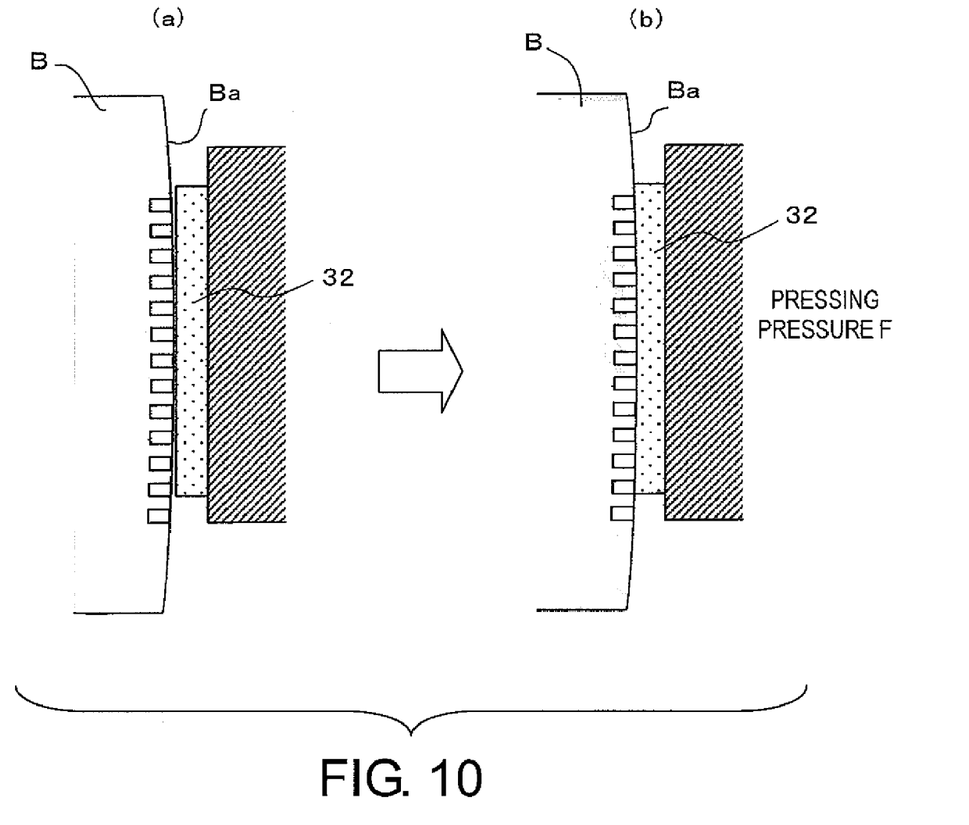
FIG. 10 is a pair of simplified cross sectional views illustrating the state in which the honing grindstone undergoes
elastic deformation such that the honing grindstone uniformly contacts the inner circumferential surface of the cylindrical bore, in the honing process shown in FIG. 7.

Specifically, during honing, in a case where the inner circumferential surface Ba is curved so that the entire surface of the honing grindstone 32 does not uniformly contact the inner circumferential surface Ba (as shown in illustration (a) of FIG. 9), the pressing force of the honing grindstone 32 is increased so that the inner circumferential surface Ba is elastically deformed as shown in illustration (b) of FIG. 9. Thus, the inner circumferential surface Ba and the entire surface of the honing grindstone 32 uniformly contact one another. Alternatively, in cases where the inner circumferential surface Ba and the entire surface of the honing grindstone do not uniformly contacts (as shown in illustration (a) of FIG. 10), the honing grindstone 32 is permitted to undergo elastic deformation by increasing the pressing force of the honing grindstone 32 as shown in illustration (b) of FIG. 10. This results in the inner circumferential surface Ba and the entire surface of the honing grindstone 32 uniformly contacting one another and elastic deformation of both the inner circumferential surface Ba and the honing grindstone 32.

Furthermore, in the abovementioned honing, in cases where the cylinder B is an aluminum alloy, a honing grindstone using diamond abrasive grains that have a high adhesion resistance is desirable.

In this third embodiment, as was described above, the raised portions in the peripheral areas around the micro-concave portions T that are generated by the micro-forming operation that forms the micro-concave portions T are removed. Accordingly, the inner circumferential surface of the cylindrical bore (surface other than the micro-concave portions) is a much smoother mirror surface than in first and second embodiments, and the sliding resistance of the cylinder B can be further reduced. Furthermore, since the raised portions in the peripheral areas around the micro-concave portions are eliminated, the flow of the lubricating oil during sliding is improved, and the clearance with mating parts such as pistons and rings can be made uniform during sliding.

In the micro-concave portion machining methods discussed above, as a result of mirror surface machining operation and plastic working operation being performed on the inner circumferential surface of the cylindrical bore, the surface roughness of the inner circumferential surface of the cylindrical bore can be greatly reduced, and the micro-concave portions T that produce an effect in reducing the sliding resistance can be formed with high precision. Here, the inner circumferential surface of the cylindrical bore is used as a sliding surface that is contacted by another member via a lubricating oil. This becomes more effective in reducing the sliding resistance as the surface roughness becomes smaller. However, if the surface roughness becomes too small, the lubricating oil retention force drops, and the thickness of the oil film is reduced so that scuffing (marring) occurs. As a result, there is a danger that the sliding resistance will increase. Accordingly, in the micro-concave portion machining methods discussed above, the surface roughness is minimized by applying mirror surface machining operation to the inner circumferential surface of the cylindrical bore, and the micro-concave portions T that function as oil reservoirs are formed by the plastic working operation. As a result, in the inner circumferential surface of the cylindrical bore, the lubricating oil retention force is increased by the micro-concave portions, and a specified oil film thickness can be ensured. The effect of the mirror surface machining and the effect of the plastic working act together, and the sliding resistance of the inner circumferential surface of the cylindrical bore can be reduced even further.

Furthermore, in the micro-concave portion machining methods discussed above, since the micro-concave portions T are formed by the plastic working operation, the micro-concave portions can be formed with high precision. The depth and cross-sectional shape of the micro-concave portions can be easily controlled compared to conventional techniques in which the micro-concave portions are formed by laser machining, and the generation of flash and debris in the peripheral areas around the micro-concave portions is eliminated, so that there is no need for a process to remove such flash and debris. Accordingly, in such aspects as well, a contribution can be made to a reduction in the manufacturing cost.

Furthermore, in the micro-concave portion machining methods discussed above, boring, or a machining process in which boring and abrasive machining are successively performed, can be employed as the mirror surface machining. Moreover, honing, grinding, lapping or super-finishing can be used as the abrasive stage of the mirror surface machining, and in an even more desirable aspect, the surface roughness Ra of the inner circumferential surface of the cylindrical bore obtained by mirror surface machining is reduced to 0.1 μm or less. As a result, an inner circumferential surface (mirror surface) that can contribute to a reduction in the sliding resistance can be obtained along with the micro-concave portions T.

The specific apparatus for performing the mirror surface machining operation described above can be appropriately selected in accordance with the characteristics of the workpiece or other factors. In recent years, for example, cylinder blocks made of aluminum alloys have been used in engines in order to reduce weight and raise performance. In the inner circumferential surfaces of the cylinders of such a cylinder block, a mirror surface with an extremely low surface roughness can be obtained merely by boring. On the other hand, in the case of the inner circumferential surfaces of cylinders comprising materials such as cast iron, steel or the like, it is difficult to obtain a sufficient surface roughness merely by boring. Thus, a mirror surface with an extremely small surface roughness can be formed by using a machining process in which boring and abrasive machining are successively performed.

Furthermore, in cases where machining operation includes honing, grinding, lapping, or super-finishing as the abrasive stage of the mirror surface machining operation, a mirror surface with an extremely small surface roughness can be formed regardless of the characteristics of the workpiece.

In the micro-concave portion machining methods discussed above, since the micro-concave portions are formed by a plastic working operation, raised portions of the thickness of the material may be generated in the peripheral areas around the micro-concave portions. Such raised portions in the peripheral areas around the micro-concave portions T have an extremely small height relative to the depth of a few microns of the micro-concave portions. Thus, there is a possibility that these raised portions will be eliminated by sliding contact with other members. However, from the standpoint of reducing the sliding resistance, it is more desirable that such raised portions be absent.

Accordingly, in a more desirable aspect of the micro-concave portion machining methods discussed above, the machining operation to remove the raised portions generated in the peripheral areas around the micro-concave portions is performed following the formation of the micro-concave portions. As a result, a further reduction in the sliding resistance of the inner circumferential surface of the cylindrical bore can be achieved.

Furthermore, in the micro-concave portion machining methods discussed above, the abrasive machining operation can be used as the machining process used to remove the raised portions in the peripheral areas around the micro-concave portions. In this case, the abrasive machining operation can be honing, grinding, lapping, or super-finishing. Furthermore, cutting that cuts away the raised portions or plastic working that crushes the raised portions can be used as the machining process used to remove the raised portions in the peripheral areas around the micro-concave portions.

In cases where the abrasive machining operation is used as the machining process used to remove the raised portions, the surface roughness of the inner circumferential surface of the cylindrical bore can be reduced, and at the same time, the raised portions can easily be removed, regardless of the nature of the workpiece. The manufacturing cost can be reduced, and in this case, the machining efficiency is high if the raised portions are removed using a fixed abrasive.

Furthermore, in the micro-concave portion machining methods discussed above, it is also possible to remove only the raised portions by the machining process used to remove the raised portions in the peripheral areas around the micro-concave portions. However, since the raised portions are extremely low, there is also a possibility that such removal machining will affect the inner circumferential surface that has been subjected to mirror surface machining beforehand. Accordingly, in a more desirable aspect of the micro-concave portion machining methods discussed above, the surface roughness Ra of the inner circumferential surface of the cylindrical bore can be reduced to 0.1 μm or less by performing the abovementioned machining to remove the raised portions, e.g., honing, grinding, lapping, or super-finishing. As a result, an inner circumferential surface (mirror surface) that can contribute to a reduction in the sliding resistance is ensured along with the micro-concave portions.

Furthermore, in the micro-concave portion machining methods discussed above, form-rolling in which machining is performed using a tool that is made to rotate while being pressed against the inner circumferential surface of the round hole can be used as the plastic working operation for forming the micro-concave portions. In this case, micro-concave portions T with good shape precision can be inexpensively formed in the inner circumferential surface of the cylindrical bore Moreover, in the micro-concave portion machining methods discussed above, pressing in which machining is performed by pressing a die having fine projecting parts against the inner circumferential surface of the cylindrical bore can be used as the plastic working operation for forming the micro-concave portions T. In this case, micro-concave portions T can be formed in a short time using a relatively simple apparatus construction. Accordingly, a further improvement in productivity and a further reduction in the manufacturing cost can be achieved.

Figure 11:
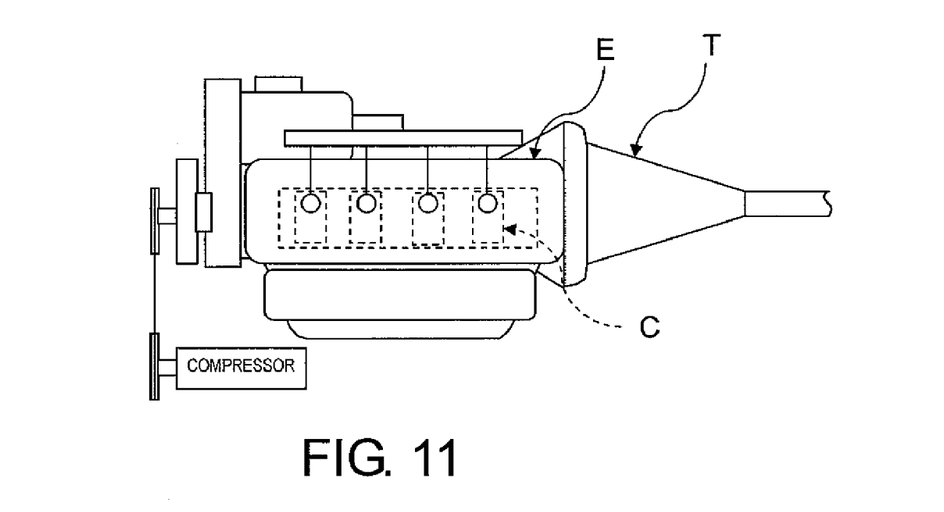
FIG. 11 is a side elevational view of an engine and a
transmission in which both have sliding structures in accordance with one embodiment.
Figure 12:
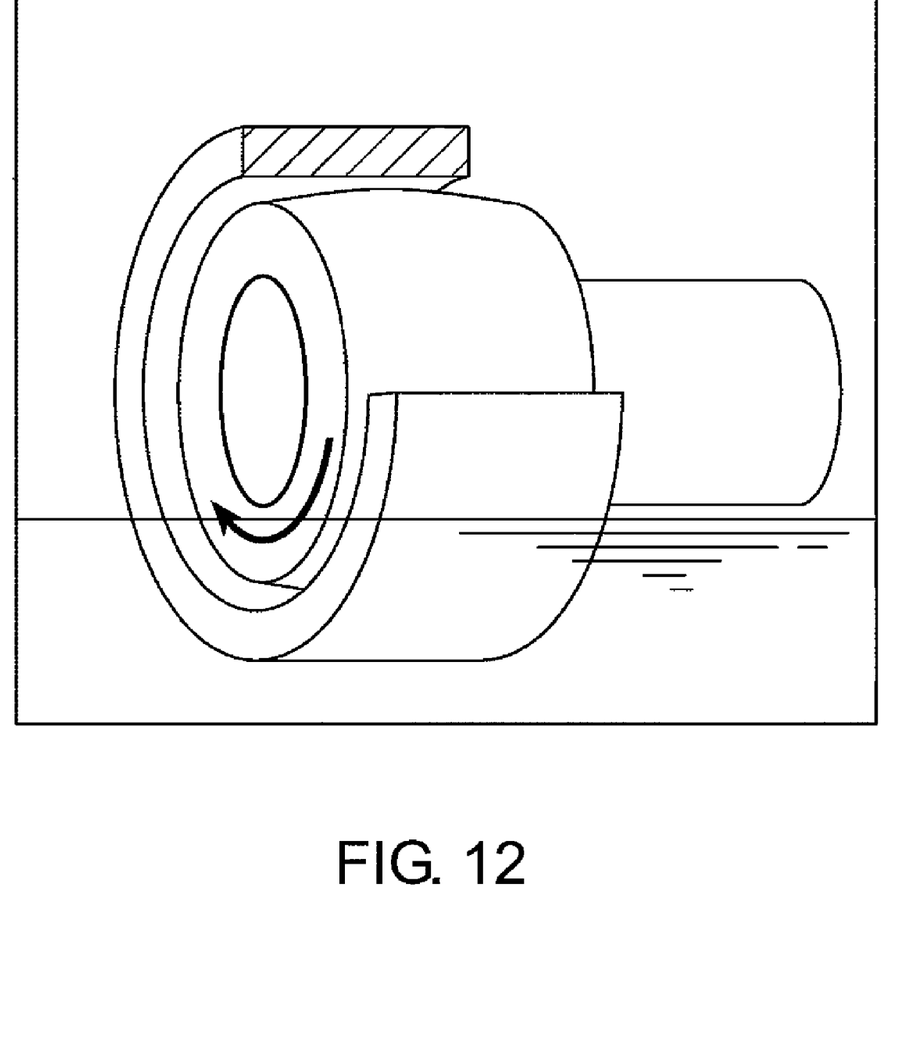
FIG. 12 is a perspective view of a sliding member (a portion
cut away) in the form of a sliding bearing in accordance with
one embodiment.

In the abovementioned micro-concave portion machining methods, the micro-concave portions T of high precision can be formed inexpensively in the inner circumferential surfaces of cylindrical bores subjected to mirror surface machining in various types of sliding members having cylindrical bores; e.g., engines or compressors having cylindrical bores constituting round holes, or sliding bearings having shaft holes constituting cylindrical bores. As a result, sliding members, engines, compressors, and sliding bearings that have a small sliding resistance can be provided. In engines in particular, an improvement in performance such as fuel economy can be achieved with such a reduction in the sliding resistance. For example, FIG. 11 illustrates a side elevational view of an engine E with a transmission T and a compressor, all of which have sliding structures formed by the micro-concave portion machining method discussed above. The engine E has a plurality of cylinder bores formed by the micro-concave portion machining method discussed above. Likewise, the compressor has a cylinder bore formed by the micro-concave portion machining method discussed above. As seen in FIG. 12, a sliding member is illustrated in the form of a sliding bearing that is formed by the micro-concave portion machining method discussed above. Furthermore, in the various types of sliding members, engines, compressors and sliding bearings described above, the sliding resistance can be sufficiently reduced via the mirror surface and micro-concave portions. Accordingly, there is no need to use materials containing expensive solid lubricants. For example, aluminum and steel can be used instead of flake graphite cast iron. Specifically, a reduction in the cost of parts can also be achieved.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A micro-concave portion machining method for acquiring a workpiece including a cylindrical bore having an inner circumferential surface with a predetermined final surface roughness and a micro-concave portion formed in the inner circumferential surface, comprising:
   mirror surface machining an axial length of the inner circumferential surface along an axial direction of the cylindrical bore formed in the workpiece so that the axial length of the inner circumferential surface has the predetermined final surface roughness;
   moving a work roller in a radial outward direction relative to a central axis of the inner circumferential surface such that the work roller presses the inner circumferential surface with a predetermined value of force after the mirror surface machining of the axial length of the inner circumferential surface is completed, the moving of the work roller being performed until the force is detected to reach the predetermined value; and
   rolling the work roller in a spiral form about the central axis of the inner circumferential surface to form the micro-concave portion in the inner circumferential surface by transferring a shape of a micro-projection of the work roller to the inner circumferential surface after the moving of the work roller in the radial outward direction is completed.

2. The micro-concave portion machining method according to claim 1, wherein
   the mirror surface machining includes performing a boring operation on the inner circumferential surface.

3. The micro-concave portion machining method according to claim 1, wherein
   the mirror surface machining includes successively performing a boring operation and an abrasive machining operation on the inner circumferential surface.

4. The micro-concave portion machining method according to claim 3, wherein
   the abrasive machining operation of the mirror surface machining includes at least one of honing, grinding, lapping and super-finishing.

5. The micro-concave portion machining method according to claim 1, wherein
   the mirror surface machining results in the inner circumferential surface having a surface roughness Ra of 0.1 μm or less.

6. The micro-concave portion machining method according to claim 1, further comprising
   removing raised portions formed on a periphery of each of the micro-concave portions after forming the micro-concave portions.

7. The micro-concave portion machining method according to claim 6, wherein
   the removing of the raised portions includes performing an abrasive machining operation for removing the raised portions on the periphery of each of the micro-concave portions.

8. The micro-concave portion machining method according to claim 7, wherein
   the abrasive machining operation includes one of honing, grinding, lapping or super-finishing.

9. The micro-concave portion machining method according to claim 6, wherein
   the removing of the raised portions results in the inner circumferential surface having a surface roughness Ra of 0.1 μm or less.

10. The micro-concave portion machining method according to claim 1, wherein
    the rolling of the work roller includes form rolling by rotating the work roller while pressing the work roller against the inner circumferential surface.

11. The micro-concave portion machining method according to claim 1, wherein
    the workpiece is a sliding member with the inner circumferential surface of the cylindrical bore being a sliding surface.

12. The micro-concave portion machining method according to claim 1, wherein
    the workpiece is an engine with the inner circumferential surface being formed on a cylinder that constitutes the cylindrical bore of a cylinder block.

13. The micro-concave portion machining method according to claim 1, wherein
    the workpiece is a compressor with the inner circumferential surface being formed on a cylinder bore that constitutes the cylindrical bore.

14. The micro-concave portion machining method according to claim 1, wherein
    the workpiece is a sliding bearing with the inner circumferential surface being formed on a shaft hole that constitutes the cylindrical bore.

* * * * *